United States Patent [19]

Tada

[11] Patent Number: 5,139,001
[45] Date of Patent: Aug. 18, 1992

[54] FUEL SUPPLY SYSTEM

[75] Inventor: Yasuo Tada, Himeji, Japan

[73] Assignee: Mitsubishi Denki K.K., Tokyo, Japan

[21] Appl. No.: 705,412

[22] Filed: May 24, 1991

[30] Foreign Application Priority Data

Jul. 6, 1990 [JP] Japan .................................. 2-180221
Jul. 17, 1990 [JP] Japan .................................. 2-191657

[51] Int. Cl.⁵ .......................................... F02M 37/04
[52] U.S. Cl. ................................. 123/520; 123/494
[58] Field of Search ............... 123/516, 518, 519, 520, 123/521, 494

[56] References Cited

U.S. PATENT DOCUMENTS

| 4,112,898 | 9/1978 | Takamoto | 123/521 |
| 4,641,623 | 2/1987 | Hamburg | 123/518 |
| 4,841,940 | 6/1989 | Uranishi | 123/520 |
| 4,846,135 | 7/1989 | Tiphaine | 123/520 |
| 4,962,744 | 10/1990 | Uranishi | 123/494 |
| 4,977,881 | 12/1990 | Abe | 123/520 |

FOREIGN PATENT DOCUMENTS

| 0185966 | 10/1983 | Japan | 123/520 |
| 0029761 | 2/1984 | Japan | 123/520 |
| 150459 | 6/1988 | Japan . | |
| 190955 | 8/1989 | Japan . | |
| 310156 | 12/1989 | Japan . | |

Primary Examiner—Carl S. Miller
Attorney, Agent, or Firm—Sughrue, Mion, Zinn, Macpeak & Seas

[57] ABSTRACT

A fuel supply system including an evaporated fuel gas purge system measuring a purge gas quantity in purging which comprises: evaporated fuel gas adsorption means having at least a suction port, an exhaust port, a purge port, a chamber in which an adsorption agent that adsorbs an evaporated fuel gas is filled, and detecting means for detecting a quantity of adsorption by the adsorption agent; purge means for purging an adsorbed gas; pressure detecting means for detecting a pressure at a purge gas exhaust part; and suction air temperature detecting means for detecting a temperature of suction air which flows in purging the adsorbed gas. By using the measured value of the purge gas quantity, a fuel injection quantity is corrected, which is determined by an air quantity for suction of the engine corresponding with the purge gas quantity.

6 Claims, 3 Drawing Sheets

FUEL SUPPLY SYSTEM

BACKGROUND OF THE INVENTION

1. Field of the Invention

This invention is related to a fuel supply system of an automobile or the like, particularly to an evaporated fuel gas purge system for adsorbing and purging evaporated gas of fuel in a fuel tank of an automobile or the like, and particularly to a fuel injection system equipped with an evaporated fuel gas purge system of fuel in a fuel tank of an automobile or the like.

2. Discussion of Background

Formerly, as disclosed in Japanese Unexamined Patent Publication No. 237348/1989, an automobile is equipped with an evaporated fuel gas adsorption device so that evaporated fuel gas in a fuel tank is not discharged to the air, which controls the adsorption and the purging of the gas corresponding with the operation of the engine.

Since the conventional evaporated fuel gas adsorption device is composed as above, the measurement of the evaporated gas quantity is not performed. Especially how much quantity of the gas is purged in purge time, is not known at all. In recent times the environmental requirement becomes severe, and exhaust gas control is more and more strengthened. Therefore, even in the purging system, it becomes necessary to know the purged gas quantity.

Furthermore, since no measurement is performed on the evaporated gas quantity, the gas quantity sucked in the engine in purge time is not known. Therefore in the conventional fuel injection system, correction is made on the purged gas quantity in purging by an estimated value obtained by tests. In view of the environmental requirement, in the exhaust gas control, the correction by the estimated value is devoid of accuracy.

SUMMARY OF THE INVENTION

It is an object of the present invention to provide a fuel supply system including an evaporated fuel gas purge system capable of accurately measuring the evaporated gas quantity which is sucked to the engine. It is another object of the present invention to provide a fuel supply system including a fuel injection system capable of correcting the fuel quantity by accurately measuring the purged gas quantity which is sucked to the engine.

According to an aspect of the present invention, there is provided a fuel supply system including an evaporated fuel gas purge system measuring a purge gas quantity in purging which comprises:

evaporated fuel gas adsorption means having at least a suction port, an exhaust port, a purge port, a chamber in which an adsorption agent that adsorbs an evaporated fuel gas is filled, and detecting means for detecting a quantity of adsorption by the adsorption agent;

purge means for purging an adsorbed gas;

pressure detecting means for detecting a pressure at a purge gas exhaust part; and suction air temperature detecting means for detecting a temperature of suction air which flows in purging the adsorbed gas.

According to another aspect of the present invention there is provided a fuel supply system including a fuel injection system which comprises:

evaporated fuel gas adsorption means having at least a suction port, an exhaust port, a purge part, a chamber in which an adsorption agent that adsorbs an evaporated fuel gas is filled, and detecting means for detecting a quantity of adsorption by the adsorption agent;

purge means for purging an adsorbed gas;

purge air quantity detecting means for detecting a purge air quantity in purging;

air quantity detecting means for detecting air quantity for suction of an engine;

fuel injection means for injecting fuel being necessary for the engine; and engine control means for operating various actuators installed in the engine by receiving signals of various sensors installed in the engine;

said engine control means detecting a purge gas quantity from the quantity of adsorption by the adsorption agent and the purge air quantity in purging the adsorbed gas, and correcting a fuel injection quantity determined by the air quantity for suction of the engine corresponding with the purge gas quantity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
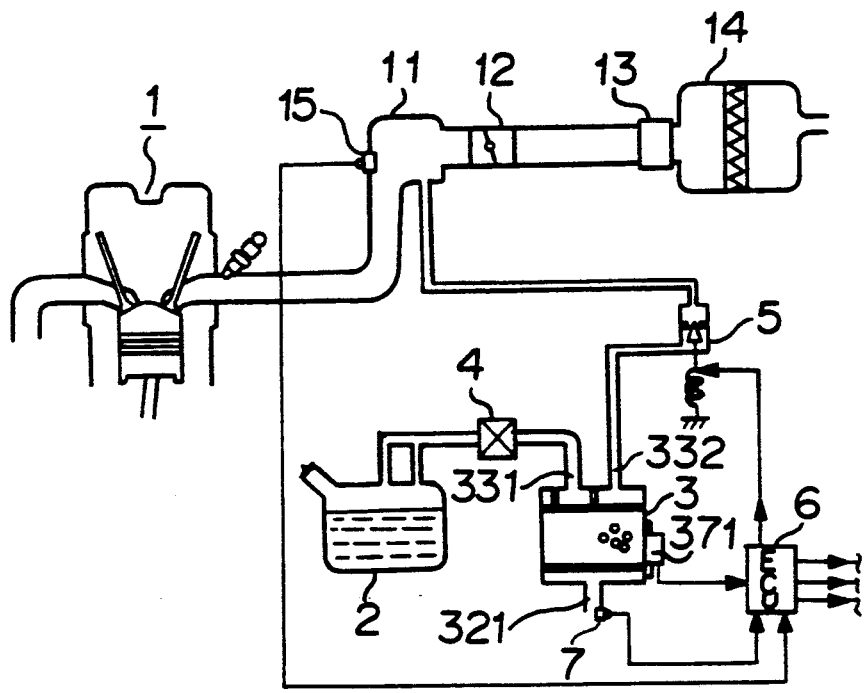
FIG. 1 is a construction diagram showing an embodiment of a fuel supply system according to the present invention.

Referring to the drawings, an embodiment of the invention will be explained. FIG. 1 is a construction diagram showing an evaporated fuel gas purge system according to the present invention. A numeral 1 signifies an engine of an automobile or the like, 11, a manifold of the engine 1, 12, a throttle valve which controls a suction quantity, 13, an air-flow quantity meter, 14, an air cleaner which introduces the outside air, and 15, a pressure sensor which detects a pressure in the manifold 11. A numeral 2 designates a fuel tank, 3, an evaporated fuel gas adsorption device, 4, a check valve installed at a pipe between the fuel tank 2 and evaporated fuel gas adsorption device 3, 5, a purge control valve which controls the purge quantity, 6, an engine control unit, and 7, a suction air temperature sensor. A numeral 321 signifies an exhaust port of the evaporated fuel gas adsorption device 3, 331, a suction port thereof, 332, a purge port thereof, and 371, a control circuit.

Figure 3:
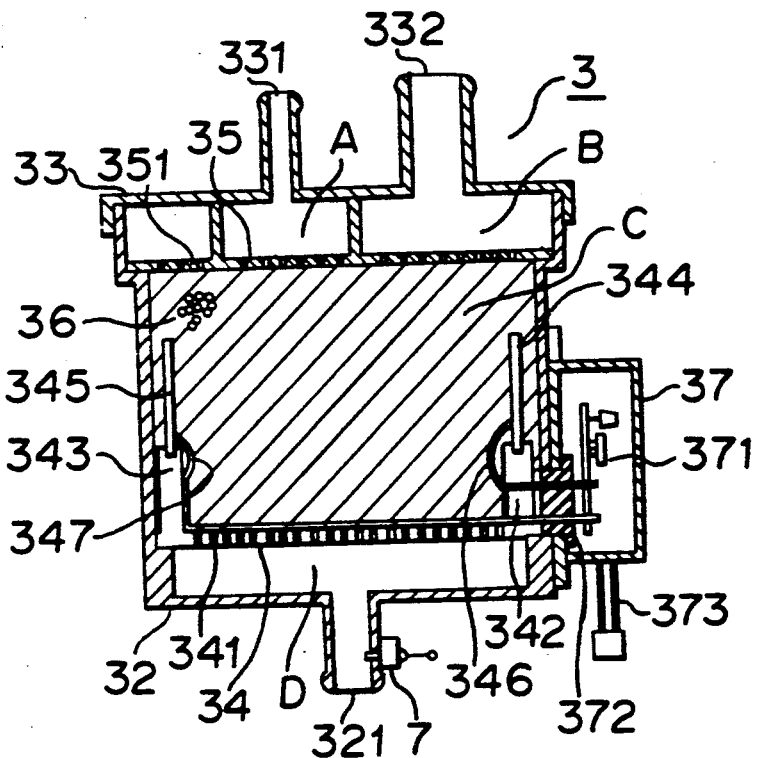
FIG. 3 is a sectional diagram showing an evaporated fuel gas adsorption device.

FIG. 3 is a detailed construction diagram of the evaporated fuel gas adsorption device 3. The partition 34 having a plurality of circulation holes 341, disposed on the bottom side of the device and the partition 35 also having a plurality of circulation holes 351, disposed on the top side of the device, are installed in the chamber sealed by the case 32 having the exhaust port 321 to the air at the bottom, and by the cap 33 having the evaporated gas suction port 331 and the purge port 332. Chambers A, B, C, and D are vertically formed by the partitions 34 and 35. Chamber A is connected to the suction port 331, chamber B, to the purge port 332, chamber D, to the exhaust port 321, and chamber C is connected to chambers A, B, and D, respectively, by the circulation holes 341 and 351.

The electrodes 344 and 345 are installed, which are oppositely formed at the retainers 342 and 343 which are formed on the partition 34 in chamber C. Furthermore, an adsorption agent 36 consisting of activated carbon is filled up in chamber C. The suction air temperature sensor 7 is installed at the exhaust port 321. the electrodes 344 and 345 are connected to the control circuit 371 installed outside of the case 32, through the lead wires 346 and 347. A numeral 37 signifies a package which accommodates the control circuit 371, 372, a grommet for taking out the lead wires 346 and 347, and 373, an external lead wire terminal.

Figure 5:
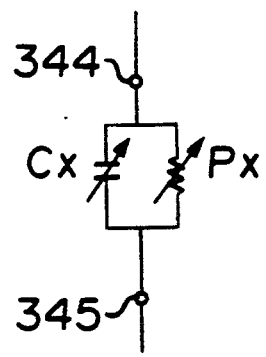
FIG. 5 is an electric equivalent circuit diagram of an adsorption quantity detecting unit.
Figure 4:
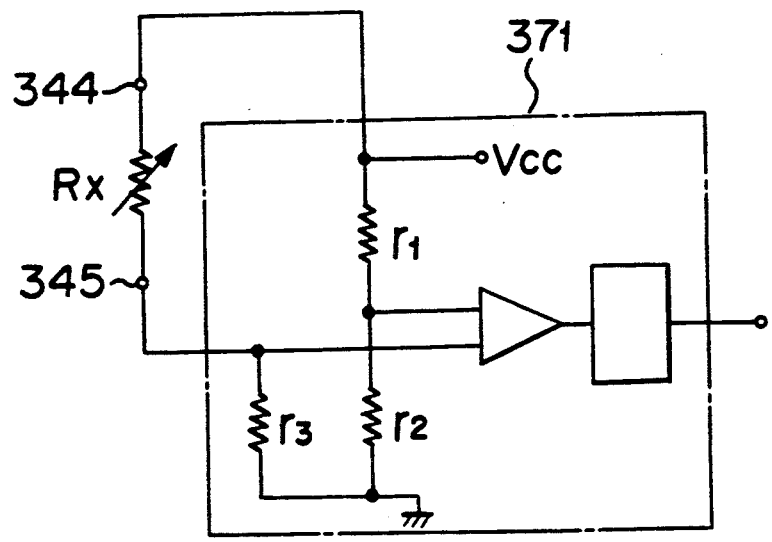
FIG. 4 is a control circuit diagram for detecting an adsorption quantity.

FIG. 4 is a diagram showing an example of the control circuit 371. In this control circuit 371, a change of the electric resistance $R_x$ between the electrodes 344 and 345, is detected. $r_1$ to $r_3$ compose a bridge resistance circuit, and $V_{cc}$ is a power source voltage. FIG. 5 is a diagram showing an equivalent circuit in which an electric capacitance $C_x$ is installed between the electrodes 344 and 345.

Next, explanation will be given to the operation of the embodiment. The evaporated gas in the fuel tank 2 is flown into chamber A through the check valve 4 and the suction port 331 when the evaporated gas quantity is increased and the pressure in the fuel tank 2 is enhanced, which is further flown into chamber C by passing through the circulation holes 351. In chamber C the gas part of the evaporated gas is adsorbed by the adsorption agent 36, and only air enters into chamber D by passing through the circulation holes 341 and is discharged to the outside air through the exhaust port 321. When the purge condition of the engine 1 is in order, the gas adsorbed in the adsorption agent 36, accompanied by the air flown from the exhaust port 321, is separated from the adsorption agent 36, and is discharged to the manifold 11. The mixture is accompanied by the air flown through the air cleaner 14, the air quantity meter 13, and the throttle valve 12, and is sucked to the engine 1.

The adsorption and the separation of the evaporated gas in the adsorption agent 36 changes an electric property of the adsorption agent 36, for instance, the conductivity, or the dielectric constant. Accordingly, the resistance value $R_x$ or the capacitance value $C_x$ between the electrodes 344 and 345 which are installed in chamber C, is changed by the adsorption or the separation of the gas. As shown in FIG. 3, the resistance Rx between the electrodes 344 and 345 constitutes an element of a bridge, and the other elements of the bridge are constituted by the fixed resistance $r_1$ to $r_3$. The power source voltage $V_{cc}$ is given to between opposing two poles of the bridge circuit formed by $r_1$ to $r_3$. Corresponding with the change of the resistance $R_x$, an electric voltage is generated between the opposing two poles. It becomes possible to measure the adsorption quantity of the evaporated gas by the change of this electric voltage.

Figure 6:
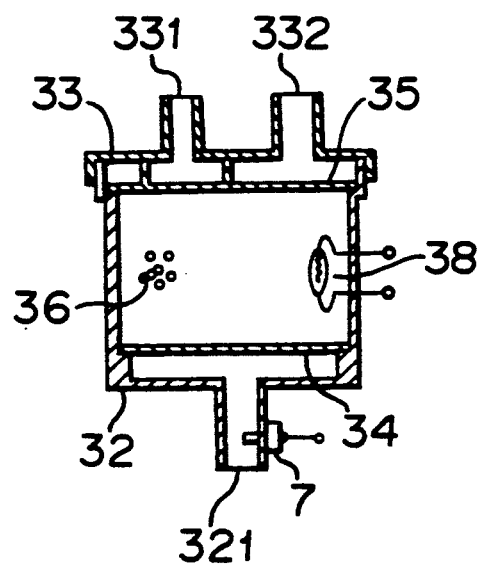
FIG. 6 is a construction diagram showing another method of adsorption quantity detection.

As stated above, explanation is given to the method of measurement utilizing the change of the electric property by the adsorption quantity of the adsorption agent 36 installed i the evaporated gas adsorption device 3. As another detection method, as shown in FIG. 6, the same effect is obtained by utilizing the change of temperature of the gas detected by the temperature sensor 38 which is embedded in the adsorption agent 36.

The quantity of gas flown to the engine 1 in the opening time of the purge control valve 5, is determined by the adsorption quantity in the adsorption agent 36, the temperature of the air flown in purge time, and the air-flow quantity. Accordingly, by measuring the pressure in the manifold 11 by the pressure sensor 15, and the temperature of the flown-in air by the temperature sensor 7, the gas quantity is obtained by the following equation.

$$G_p \infty Q_p f(T_a) = \sqrt{P_a - P_I} \cdot S_p f(T_a) \qquad (1)$$

where Gp is purge gas quantity, $Q_p$, purge air quantity, $P_a$ atmospheric pressure, $P_I$, manifold pressure, $T_a$, flown-in air temperature, and $S_p$, a sectional area of purge passage. As explained above, according to the invention, a gas suction quantity detect mechanism is installed in the evaporated fuel gas adsorption device, measurement is made on the temperature of the flown-in air in purge time, and measurement is made on the pressure at the entrance of the purge gas flow into the engine. By these measurements the flown-in air quantity is obtained, which enables to accurately inform of the flown-in gas quantity to the engine.

Figure 2:
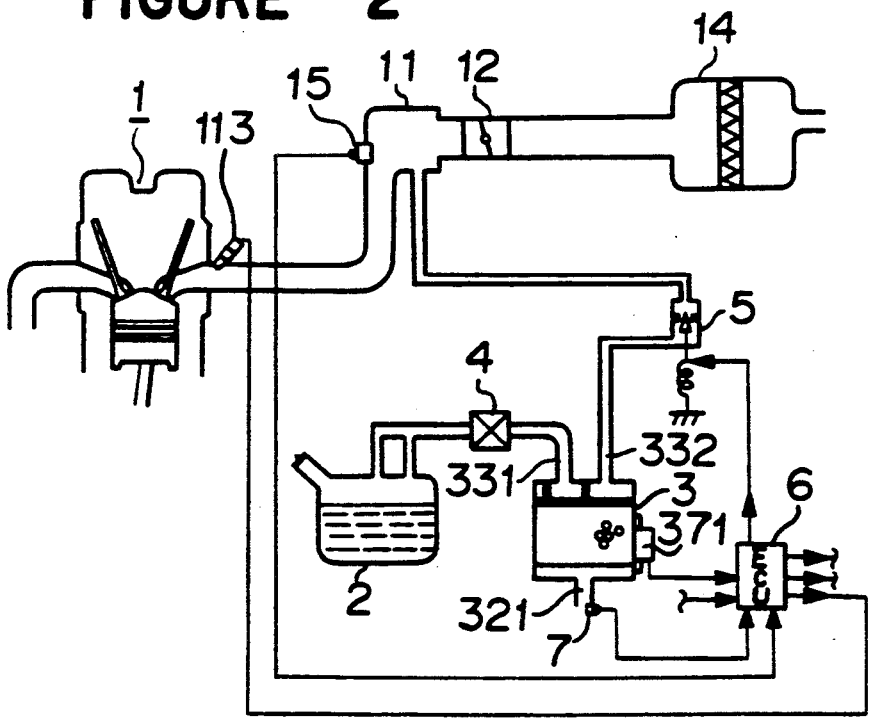
FIG. 2 is a construction diagram showing a second embodiment of the fuel supply system according to the invention.

Referring to the drawings, a second embodiment of the present invention will be explained. FIG. 2 is a construction diagram showing an embodiment of a fuel supply system according to the present invention. In FIG. 2, the same numeral is given to the same or the corresponding parts in FIG. 1. A numeral 113 signifies an injector. As for the other parts explanation is omitted. As for the evaporated fuel ga adsorption device 3, shown in FIGS. 3 to 5, explanation will be omitted since the device is the same as in the first embodiment.

Next, explanation will be given to the operation of the second embodiment. Air having an air quantity which is determined by the opening degree of the throttle valve 12 which corresponds with an acceleration pedal not shown, is sucked by the engine 1. At the same time fuel is injected from the injector 113 so that the air-fuel mixture has a predetermined mixture ratio. This mixture is combusted in engine 1, and generates an output. A fuel injection quantity of fuel from the injector 113 is determined by the engine control unit 6 mainly from a pressure in the manifold 11, that is, the output of the pressure sensor 15 and a revolution number of the engine 1, as signal inputs. Therefore, when there is no purging of the evaporated gas, the mixture ratio can be determined mainly by the pressure sensor 15 and the revolution number of the engine 1. When the purging takes place, the mixture ratio is changed by the purge gas quantity. Accordingly, by knowning the gas quantity of the purging, correction is made on the mixture ratio. The purge gas quantity is determined by the gas quantity which is adsorbed in the adsorption agent 36, and the purge air quantity flown in the manifold 11 in the purge time.

As for the detection method of the purge gas quantity, since the same method with than in the first embodiment is utilized, the explanation is omitted.

The gas quantity flown into he engine 1 in opening time of the purge control valve, is also determined by the equation (1) in this second embodiment. An optimum mixture ratio which is required by the engine 1 is maintained even in the purge time by correcting the fuel quantity at the injector 113 which is determined by the pressure sensor 15 and the revolution number of the engine 1, adapted to the purge gas quantity, by the following equation.

$$G = \frac{1}{A/F}(1 - G_p) \cdot \int Q_a \qquad (2)$$
$$= \frac{1}{A/F}(1 - G_p) \cdot K \frac{P_I \cdot N}{T}$$

where G is fuel quantity, $Q_a$, engine suction air quantity, A/F, target mixture ratio, K, a constant, and N, revolution number.

As stated above, explanation is given to the method in the fuel injection system which determines the fuel quantity by the pressure and the revolution number. In this system, the pressure sensor 15 which is utilized in the fuel injection system, can also be utilized for the detection of the purge gas quantity, which is an economical system. On the other hand, in the system in which a required fuel quantity is determined by the suction air quantity of the engine 1 in use of an air quantity meter, the same effect as the above is obtained by installing a pressure sensor at the purge gas exhaust part and by detecting the pressure.

Furthermore, in tis embodiment, explanation is given to the method of measurement of the purge air quantity in purge time by pressure and temperature. However the same effect is obtained by directly measuring the purge air quantity utilizing an air-flow quantity meter.

As explained above, according to the invention, detecting means for detecting the gas adsorption quantity of the evaporated fuel gas, as well as purge air detecting means for detecting the purge air quantity which is flown in purge time, are installed. Through these means, the purge gas quantity in purge time is detected, and the fuel injection quantity is corrected corresponding to the purge gas quantity. Therefore even in purge time, the predetermined mixture ratio which is required by the engine, is always maintained, which realizes a fuel injection system excellent in purification of exhaust gas or in output stabilization of the engine.

Obviously, numerous modifications and variation of the present invention are possible in light of the above techniques. It is therefore to be understood that within the scope of the appended claims, the invention may be practiced otherwise than as specifically described herein.

What is claimed is:

1. A fuel supply system including an evaporated fuel purge system for calculating a purge gas quantity comprising:
   evaporated fuel adsorption means having at least a suction port, an exhaust port, a purge port, and a chamber containing an adsorption agent for adsorbing an evaporated fuel gas;
   fuel adsorption detecting means for detecting a quantity of fuel adsorbed by said adsorption agent;
   purge means for purging said purge gas quantity;
   pressure detecting means for detecting a pressure at a purge gas exhaust port of said purge gas system;
   air temperature detecting means for detecting a temperature of suction air; and
   calculating means for calculating said purge gas quantity in accordance with said pressure of said purge gas system and said temperature of said suction air.

2. A fuel supply system including a fuel injection system and an evaporated fuel purge system for calculating a purge gas quantity comprising:
   evaporated fuel adsorption means having at least a suction port, an exhaust port, a purge port, and a chamber containing an adsorption agent for adsorbing an evaporated fuel gas;
   fuel adsorption detecting means for detecting a quantity of fuel adsorbed by said adsorption agent;
   purge means for purging said purge gas quantity;
   pressure detecting means for detecting a pressure at a purge gas exhaust port of said purge gas system;
   air temperature detecting means for detecting a temperature of suction air;
   calculating means for calculating said purge gas quantity in accordance with said pressure of said purge gas system and said temperature of said suction air;
   fuel injection means for injecting fuel into an engine; and
   engine control means, responsive to said calculating means, for correcting a fuel injection quantity provided to said fuel injection means.

3. A fuel supply system as claimed in claim 1 wherein said fuel adsorption detecting means comprises:
   a temperature sensor contained in said chamber for determining an amount of evaporated fuel adsorbed by said adsorption agent.

4. A fuel supply system as claimed in claim 2 wherein said fuel adsorption means comprises:
   a temperature sensor contained in said chamber for determining an amount of evaporated fuel adsorbed by said adsorption agent.

5. A fuel supply system as claimed in claim 1 wherein said fuel adsorption means comprises:
   electrodes contained in said chamber for determining an amount of evaporated fuel adsorbed by said adsorption agent.

6. A fuel system as claimed in claim 2 wherein said fuel adsorption means comprises:
   electrodes contained in said chamber for determining an amount of evaporated fuel adsorption by said adsorption agent.

* * * * *